United States Patent [19]

Ignasiak et al.

[11] Patent Number: 5,019,245

[45] Date of Patent: May 28, 1991

[54] METHOD FOR RECOVERY OF HYDROCARBONS FORM CONTAMINATED SOIL OR REFUSE MATERIALS

[76] Inventors: Teresa Ignasiak, 417 Heffernan Drive, Edmonton, Alberta, Canada, T6R 1E7; Ali A. Turak, 3125 - 109 Street, Edmonton, Alberta, Canada, T6J 4N6; Wanda Pawlak, 407 Saddleback Road, #203, Edmonton, Alberta, Canada, T6J 4M6; Boleslaw L. Ignasiak, 10967 34 A Avenue, Edmonton, Alberta, Canada, T6J 2T9; Carlos R. Guerra, 6050 Boulevard E., West New York, N.J. 07093; Melvin L. Zwillenberg, 475 Richmond Ave., Maplewood, N.J. 07040

[21] Appl. No.: 360,313

[22] Filed: Jun. 2, 1989

[51] Int. Cl.$^5$ .......................... B03D 1/02; B03D 9/02; B03D 9/06; C10G 1/00

[52] U.S. Cl. ..................... 209/166; 209/17; 209/5; 210/704; 210/693; 210/694; 210/908; 210/909; 134/25.1; 134/40; 208/425; 208/182

[58] Field of Search ................. 209/164, 166, 167, 17, 209/5; 210/703, 704, 705, 706, 707, 908, 909, 693, 694; 585/864; 208/425, 180, 182; 134/25.1, 40, 10

[56] References Cited

U.S. PATENT DOCUMENTS

| | | |
|---|---|---|
| 3,268,071 | 8/1966 | Puddington et al. . |
| 3,725,538 | 4/1973 | Brewer . |
| 3,892,661 | 7/1975 | Siviour ........................ 210/694 |
| 3,932,145 | 1/1976 | Foulke . |
| 4,076,505 | 2/1978 | Dessau . |
| 4,080,176 | 3/1978 | Verschuur . |
| 4,224,038 | 9/1980 | Masologites et al. . |
| 4,234,320 | 11/1980 | Verschuur . |
| 4,249,910 | 2/1981 | Masologites et al. . |
| 4,255,155 | 3/1981 | Frankovich . |
| 4,255,156 | 3/1981 | Sun et al. . |
| 4,270,926 | 6/1981 | Burk, Jr. et al. . |
| 4,270,927 | 6/1981 | Burk, Jr. et al. . |
| 4,297,108 | 10/1981 | Horowitz et al. . |
| 4,309,192 | 1/1982 | Kubo et al. . |
| 4,317,711 | 3/1982 | Yan ............................ 208/425 |
| 4,336,136 | 6/1982 | Giguere ..................... 210/221.2 |
| 4,355,999 | 10/1982 | Masologites . |
| 4,392,892 | 7/1983 | Wagner ....................... 134/25.1 |
| 4,396,396 | 8/1983 | Mainwaring . |
| 4,415,335 | 11/1983 | Mainwaring et al. . |
| 4,448,584 | 5/1984 | Masologites et al. . |
| 4,448,585 | 5/1984 | Yoo . |
| 4,456,528 | 6/1984 | Akimoto et al. . |
| 4,496,533 | 1/1985 | Clausius . |
| 4,549,966 | 10/1985 | Beall ........................... 210/908 |
| 4,579,650 | 4/1986 | Nankee et al. . |
| 4,583,990 | 4/1986 | McGarry et al. . |
| 4,601,729 | 7/1986 | Capes et al. . |
| 4,783,263 | 11/1988 | Trost ........................... 210/705 |
| 4,923,125 | 5/1990 | Bateson ....................... 209/164 |

FOREIGN PATENT DOCUMENTS

| | | | |
|---|---|---|---|
| 178009 | 4/1986 | European Pat. Off. | ............ 210/705 |
| 1078066 | 7/1976 | Japan ................... | 210/705 |
| 53-85950 | 7/1978 | Japan ................... | 210/706 |
| 2023172 | 12/1979 | United Kingdom . | |
| 2162196 | 1/1986 | United Kingdom | ............ 210/705 |

OTHER PUBLICATIONS

Penott et al., "The Use of Oil in Cleaning Coal", Chem. and Metallurg. Eng., vol. 25, No. 5, (1921).

Primary Examiner—Stanley Silverman
Assistant Examiner—Thomas M. Lithgow

[57] ABSTRACT

A method is provided for separating an inert solid substantially inorganic fraction comprising sand or soil from a tarry or oily organic matter in a feedstock. The feedstock may be contaminated soil or tarry waste. The feedstock is combined with pulverized coal and water. The ratio (oil or tar to dry weight of coal) of about 1.0:10 to about 4.0:10 at a temperature in the range of 60°-95° C. The mixture is agitated, the coarse particles are removed, and up to about 0.10% by weight (based on weight of coal) of a frothing agent is added. The mixture is then subjected to flotation, and the froth is removed from the mixture.

7 Claims, 2 Drawing Sheets

METHOD FOR RECOVERY OF HYDROCARBONS FORM CONTAMINATED SOIL OR REFUSE MATERIALS

The present invention is directed to a method of separating tarry or oily organic matter from inert solid inorganic substrates. The invention is particularly useful for cleaning oil-polluted soil and tar wastes.

BACKGROUND OF THE INVENTION

With the increasing awareness of pollution of the environment, the present invention is directed to the problem of cleaning oil or tar-contaminated materials, such as oil-contaminated soils. The present application is also applicable to the recovery of tars from tar wastes, which may be found, for example, as residues from petroleum refining processes. There is increasing interest in the cleanup of soils contaminated with tarry and/or oily organic matter which can originate from a variety of coal/petroleum-based industries, or from spills that may occur during oil production or transportation, or from pond tailings produced during heavy oil recovery. Extraction of oil-contaminated soils by hot water processes and flotation is not entirely successful due to poor flotation response, poor selectivity and due to the generation of a froth that is difficult to handle. The high viscosity of hydrocarbon contaminants as well as the presence of charred materials with particle sizes over 0.6 mm contributes significantly to the poor release of contaminants from the soil. There is thus need for improving methods for removing oil or tar contamination from soil.

It is thus an object of the present invention to provide a process for separating tarry or oily organic matter from solid inert substantially inorganic feedstocks contaminated with such organic matter.

It is yet another object of the present invention to provide a method for removing oil or tar contamination from soil.

It is yet another object of the present invention to remove the tar from tar refuse and waste.

These and other objects of the present invention will be apparent from the following description and from the practice of the invention.

SUMMARY OF THE INVENTION

The present invention provides a method for separating a solid inert substantially inorganic fraction comprising sand or soil from tarry or oily organic matter in a feedstock comprising such fraction and such organic matter, comprising the steps of combining the feedstock with water and pulverized coal to form a first mixture, wherein the ratio of the approximate weight of the organic fraction in the feedstock to the dry basis weight of the coal is in the range of about 1.0:10 to about 4.0:10; agitating the first mixture and separating coarse particles therefrom; adding to the first mixture up to about 0.1% by weight of a frothing agent, based on the total weight of the coal, thereby forming a second mixture; agitating the second mixture to form a floating froth comprising agglomerates of the coal and the tarry oil or oily organic matter; and separating the froth from the second mixture.

When the feedstock comprises oil-contaminated soil, the first mixture will comprise soil mixed with water at a solids concentration in the range of about 25-90% at a temperature in the range of about 20°-95° C. and the ratio of the oil to dry coal will be in the range of about 1.0:10 to 4.0:10. The first mixture is tumbled for about 5-15 minutes then screened to separate coarse particles, then the frothing agent is added in an amount of about 0.01-0.10% by weight based on the total coal present. The frothing is accomplished by supplying air into this second mixture and mechanically mixing it at a temperature in the range of about 40°-60° C. Subsequent to separation of the froth there are additional steps of resettling the remaining portion of the second mixture to form clean soil and supernatant water, and separating the clean soil from the supernatant water.

When the feedstock comprises tar wastes, the first mixture is maintained at a temperature in the range of about 75°-85° C. at a pH in the range of about 7-9 and the tar-to-dry coal ratio is in the range of about 1.0:10 to 4.0:10. This first mixture is tumbled for about 5-15 minutes, screened to separate coarse particles and then, prior to adding the frothing agent, there are the additional steps of agitating the mixture with high shear force for about 2-5 minutes to form agglomerates, then adding a sufficient amount of water at a pH in the range of about 7-7.5 at a temperature in the range of about 80°-85° C. to the agglomerate-containing mixture to obtain a concentration of about 5% weight/weight total solids. The frothing agent is then added in an amount of about 0.01-0.10% by weight basing on the total amount of coal and the mixture is agitated by supplying air with mechanical mixing. Subsequent to separating the froth, there are the further steps of washing the froth over screens, to collect the cleaned agglomerates, and collecting the washing and combining it with the remaining portion of the second mixture to form a third mixture, then cycloning the third mixture to separate sand from other materials.

DESCRIPTION OF THE INVENTION

Figure 1:
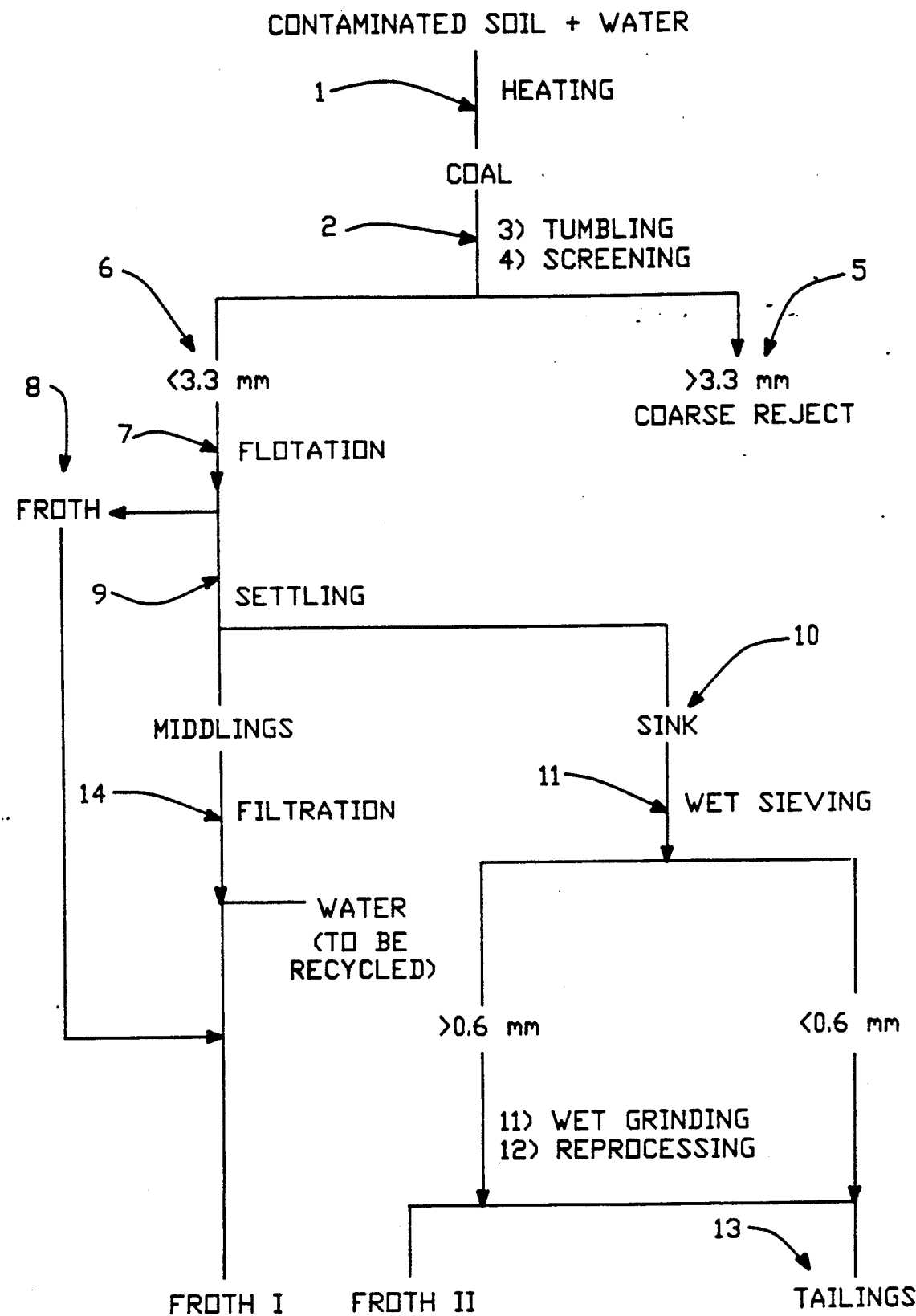
FIG. 1 is a flowchart showing the preferred steps according to the present invention for treating oil-contaminated soil.

The present invention is directed to a method for separating tarry or oily organic matter from a solid inert substantially inorganic fraction, such as sand or soil. The separation may be accomplished for the purpose of, on the one hand, recovering clean soil for return to the environment or, on the other hand, for recovering the organic substance from a tarry waste, such as found in the bottoms of some various processes in petroleum refining. Thus the feedstock according to the present invention will comprise either sand or soil or other inorganic solids with which there is physically mixed a tarry or oily organic matter, such as oil or tar.

In general, the feedstock will first be combined with pulverized coal and with water to form a first mixture. The ratio of the approximate weight of the organic fraction in the feedstock to the dry basis weight of the coal will be in the range of about 1.0:10 to about 4.0:10. The type of coal utilized will be any type of mined coal including anthracite, bituminous and subbituminous coals, such as well chars, cokes and any type of activated carbon. The coal will be ground to the size range of particles which pass through sieves in the range of about 600-300 micrometers in diameter.

To form the feedstock, water and soil may first be mixed and then the coal will be added thereto, or, alternatively, a slurry of the coal and water may first be formed then mixed with the soil.

The mixture will be mixed together at a temperature in the range of about 60°–95° C. Therefore, in preferred embodiments of the invention, more particularly described hereinbelow, when initially forming the water and soil mixture or water and coal mixture, these water mixtures may be heated to a desired temperature.

According to a preferred embodiment wherein the feedstock comprises oil or tar-contaminated soil, the contaminated soil will first be mixed with enough water to form a final solids concentration in the range of about 25–90% by weight. This soil-water mixture will then be brought to a temperature in the range of about 60°–95° C., then the ground coal, preferably of the size whereby 100% of the particle pass through sieves of 600 micrometer openings or less, will be added to the hot soil-water mixture in an amount to obtain a ratio of tar (or oil) to coal (dry basis) between about 1.0:10 and 4.0:10. To determine this ratio it will be necessary to estimate the approximate amount of the tar (or oil) present in the contaminated soil. This amount may be readily determined by solvent extraction.

In an alternative embodiment, particularly where the feedstock comprises a tarry waste, such as is usually the bottoms from various petroleum refining processes which also contain inorganic particulate matter such as sand, a water slurry of the ground coal and water will first be formed. It is preferred that the water slurry be formed from finely ground coal of the size whereby 100% of the particles pass through opening of a 600 micrometer mesh screen or less, and that the slurry be formed by mixing coal to water. The pH of the water will preferably be in the range of about 7–9 and the water will be heated to a temperature in the range of about 60°–85° C. The tar wastes are then mixed into the hot coal-water slurry in an amount to result in a ratio of tar to coal (dry basis) between about 1.0:10 and 4.0:10. In order to determine this ratio it will again be necessary to determine the approximate amount of tar contained in the sample which is being processed.

The second step according to the present invention is to agitate the feedstock mixture at a temperature within the range of about 60°–95° C. The first mixture will be tumbled preferably in a drum for about 5–15 minutes and then screened on screens having openings in the range of 0–1.0 and 1–4.75 mm to separate the coarse (tar and oil-free) reject from the mixture.

The first mixture is further processed by agitating it with high shear force, such as in a high shear mixer, for about 2–5 minutes to form microagglomerates. Then water (pH in the range of 7–7.5) is added to the agglomerate-containing slurry to obtain a slurry of about 5–10% by weight total solids content. The slurry, thus prepared, is ready for the third step according to the present invention of the flotation.

In the flotation step, a commercial frothing agent selected from the group consisting of polymeric, anionic and cationic frothing agents is added in an amount of approximately 0.01–0.10% by weight of the coal present, and then conditioned within a conventional flotation machine for about 30–60 seconds. Conventional flotation machines may be utilized in this step such as a Denver Laboratory flotation machine.

This flotation step will be conducted in the temperature range of about 40°–60° C. Depending on the source of the contamination, in some cases a froth collecting agent such as kerosene, diesel or bitumen/diesel may also be added in an amount varying from about 0.5 to 3% by weight of the coal present. This froth collecting agent will be added when the mixture is first added to the flotation cell. Then, according to the fourth step accoding to the present invention, the mixture containing the frothing agent (referred to as the second mixture) is floated by bubbling air through the mixture for about 2–5 minutes (usually by rotating an agitator at about 1100 rpm).

Then, in general, the last step according to the present invention will be to separate the froth from the second mixture. Depending upon the nature of the feedstock (i.e., either soil or tarry waste), subsequent processing will depend upon whether it is desired to recover the inorganic matter (the soil) or the organic matter (the tar from the tarry waste).

If the second mixture comprises the soil, the froth will thus be skimmed off and the soil residue will be resettled to separate the sink (the clean soil) from the supernatant water, the latter of which then can be recycled into the first step according to the invention. The froth will contain a major portion of the tar or oily substance which was previously absorbed in the soil and which is now absorbed on the coal particles. However in some cases with high tar refuse samples, a small (by weight) but large (by volume) amount of middlings is collected which may be rich in tar and therefore will be combined with the froth (after separation from aqueous phase by filtration). In some cases the feedstock will yield tailings (sink) that contains visible coke and/or char particles. Since the amount of tar retained increases with the increasing concentration of chars, cokes and slags in the tailings, sometimes wet grinding of the tailings will be required. These ground tailings can be then reprocessed with the coal.

Alternatively, if the feedstock does not contain the coarse particles, the froth may be collected and washed on screens (preferably of openings of 300–400 microns) to separate the clean agglomerates. The wash water and the flotation tailings may then be passed through a cyclone to separate the coarse sand from the water. The water may then be processed by filtration for recycling.

Referring to the figures, in FIG. 1 there is a schematic diagram of the steps according to the present invention for treatment of contaminated soil. Contaminated soil and water is mixed in step 1 and heated. Coal is then added in step 2. The mixture is tumbled in step 3 and screened in step 4 to separate particles of greater than about 3.3 mm in size. Coarse reject 5 is then separated and the remaining mixture 6 is subjected to flotation step 7 where the froth 8 is separated subsequent to flotation. The remaining mixture is allowed to settled in step 9. The tailings from step 9 (sink 10) are subjected to wet sieving in step 11 to separate particles of greater or less than 0.6 mm. Particles greater than 0.6 mm are subjected to wet grinding in step 11 and reprocessed (collectively shown as step 12) beginning again with step 1. The particles less than 0.6 mm in size are added to the tailings 13 from reprocessing step 12. Froth II comprises the froth from reprocess step 12.

The middlings from the settling step 9 are filtered in step 14 to separate water, which is recycled, and smaller particles, which are added to the froth B from the flotation step 7 to constitute froth fraction Froth I.

Figure 2:
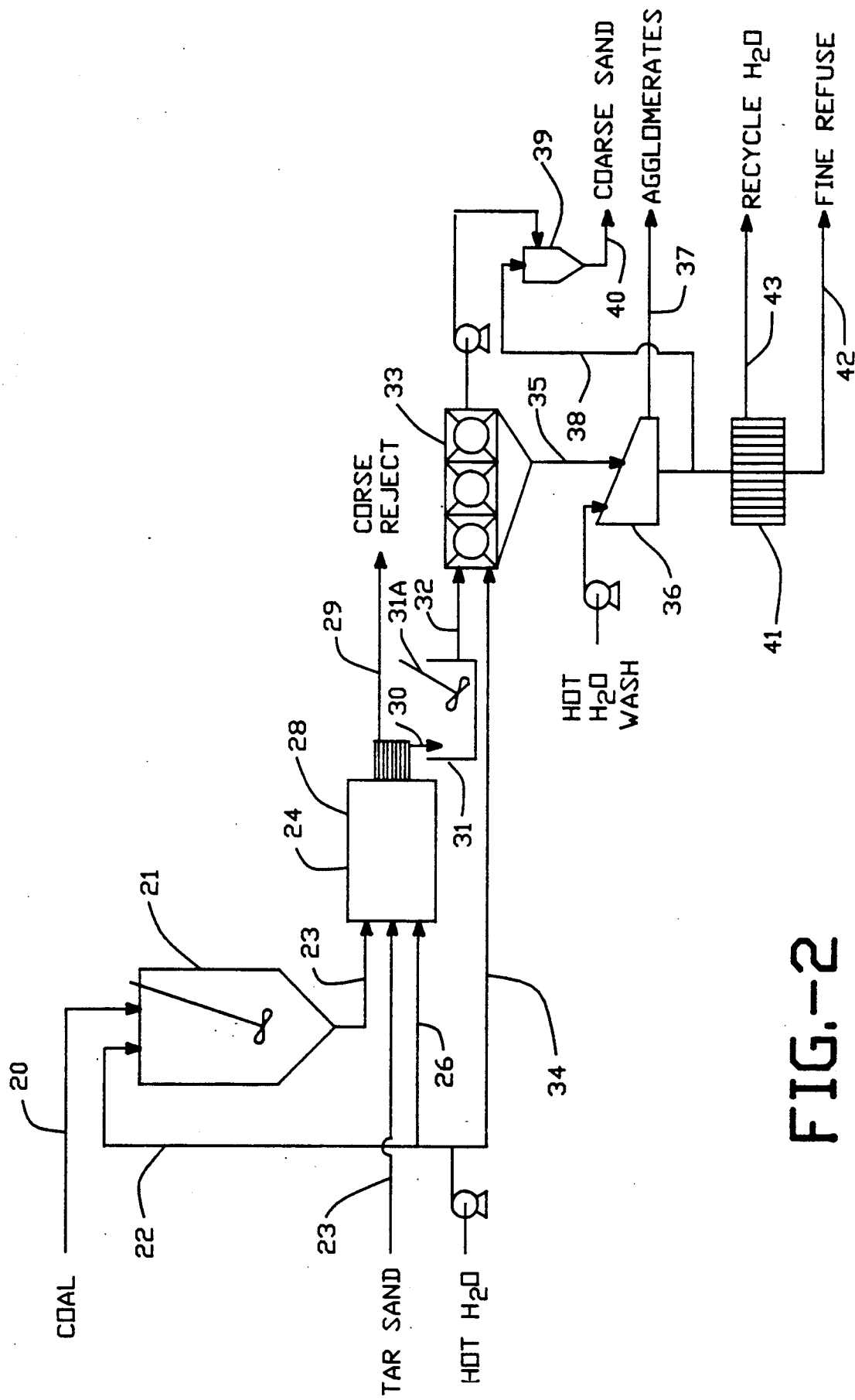
FIG. 2 is a schematic diagram of apparatus for use of the method according to the present invention.

Referring to FIG. 2 there is shown an apparatus for recovery of tar wastes according to the present invention. Pulverized coal is added through line 20 into slurry tank 21. Hot water is added to tank 21 through line 22. The coal and water are slurried in tank 21 then conducted via line 23 into the tumble washer 24. Tar sand is added to tank 24 via line 25.

Additional hot water may be added to tank 24 via line 26. After tumbling, the slurry is removed from tank 24 and screened through screening means 28 from which the coarse reject is collected via line 29. The remaining mixture is directed via line 30 into agglomerator 31 where it is processed by high shear mixing (high shear agitator 31A is shown) to form agglomerates. The agglomerated mixture is then conducted via line 32 into the flotation cell 33 where hot water is added via line 34 in a sufficient amount to obtain about a 5% total solids mixture. The frothing agent is added and the mixture is subjected to flotation and moderate mixing. The froth is taken via line 35 to dewatering screen 36 where it is washed with water. The agglomerates are withdrawn through line 37. The tailings are taken via line 38 to cyclone 39 and cycloned to separate the coarse sand via line 40 and added to water from the dewatering screen 36. The combined water from cyclone and dewatering screen is then filtered through filter 41 to collect the fine refuse through line 42. The clarified water is then recycled via line 43.

Having described the preferred embodiments of the present invention, the following examples are presented by way of illustration. The examples are not intended to limit the invention in any way.

EXAMPLE 1

A sample of oil-contaminated soil was subjected to the process as shown in FIG. 1. The results are shown below in Table 1. The first stage is that which is described in the flowchart in FIG. 1. The second stage is the result when the greater than 6 mm particles are wet ground and the mixture is reprocessed (step 12 in FIG. 1).

EXAMPLE 2

A tar waste was treated in accordance with the invention on an apparatus as shown in FIG. 2. The material balance from the tar recovery process is shown below in Table 2. As can be seen from the table, compared to the total feed, subsequent to the treatment according to the process the agglomerates contain 95.33% of the coal and coke, 77.71% of the tar and 18.57% of the ash. By contrast the tailings contain 3.94% of the coal and coke, 1.73% of the tar and 75.76% of the ash.

TABLE 1

CLEAN-UP OF CONTAMINATED SOIL

| Cleaned Soil | Soil Recovery wt %[a] | Ash content of Soil wt %[a] | Toluene extractables wt % |
|---|---|---|---|
| 1st stage | 80.8 | — | 0.61 |
| 2nd stage[b] | 74.8 | 95.2 | 0.26 |
| Feed | 100.0 | 84.2 | 5.80 |

[a] moisture free basis
[b] wet grinding and reprocessing

TABLE 2

MATERIAL BALANCE OF TAR RECOVERY PROCESS

| STREAMS | WEIGHTS (g) | WEIGHTS (%) | ASSAYS (%) Coal/Coke | ASSAYS (%) Tar* | ASSAYS (%) Ash | DISTRIBUTION (%) Coal/Coke | DISTRIBUTION (%) Tar* | DISTRIBUTION (%) Ash |
|---|---|---|---|---|---|---|---|---|
| COAL | 38.54 | 39.00 | 90.01 | — | 9.99 | 72.03 | — | 11.05 |
| TAR | 60.27 | 61.00 | 22.35 | 26.25 | 51.40 | 27.97 | 100.00 | 88.95 |
| TOTAL FEED | 98.81 | 100.00 | 48.74 | 16.01 | 35.25 | 100.00 | 100.00 | 100.00 |
| TOTAL PROD | 93.23 | 94.35 | 48.38 | 12.72 | 33.25 | 99.27 | 77.44 | 94.33 |
| AGGLOMERATES | 64.67 | 65.45 | 70.99 | 19.01 | 10.00 | 95.33 | 77.71 | 18.57 |
| TAILINGS | 28.56 | 28.90 | 6.64 | 0.96 | 92.40 | 3.94 | 1.73 | 75.76 |

*Xylene solubles
Note:
All values on moisture free basis

What is claimed is:

1. A method for separating an inert solid substantially inorganic fraction comprising sand or soil from tarry or oily organic matter in a feedstock comprising said fraction and said organic matter, comprising the steps of:
   (a) combining said feedstock with pulverized coal and with water to form a first mixture, the ratio of the estimated weight of said organic fraction in said feedstock to the dry basis weight of said coal being in the range of about 1.0:10 to about 4.0:10;
   (b) agitating said first mixture at a temperature in the range of about 60°-95° C., then separating coarse particles of greater than a predetermined size from said first mixture to yield a resultant mixture without said coarse particles;
   (c) adding to said resultant mixture from step (b) separated from said coarse particles up to about 0.10% by weight of a frothing agent and optionally up to 2% of froth collecting agent, based on the total weight of said coal used in said step (a) thereby forming a second mixture;
   (d) agitating said second mixture to form a floating froth comprising agglomerates of said coal and said tarry or oily organic matter;
   (e) separating said froth from said second mixture.

2. A method according to claim 1 wherein said feedstock comprises oil-contaminated soil, said solid inert organic fraction comprises soil and said organic matter comprises said oil.

3. A method according to claim 2 wherein in said step (a) said first mixture comprises said oil-contaminated soil at a solids concentration in the range of about 25-90% in water at a temperature in the range of about 60°-95° C., and said particulate coal; wherein said ratio of oil to dry coal is in the range of about 1.0:10 to about 4.0:10;

in said step (b) said first mixture is tumbled for about 5-15 minutes; then screened to separate particles therefrom of average diameter greater than about 1.0 mm;

in said step (c) said frothing agent is selected from the group consisting of polymeric, anionic and cationic surfactants and is added to said resultant mixture in an amount of about 0.01-0.10% by weight based on the total amount of said coal; in said step (d) said agitation is accomplished by injecting air to said second mixture with mechanical mixing at a temperature in the range of about 40°-60° C.; and subsequent to said step (e), further comprising the steps of allowing the remaining portion after removal of said froth of said second mixture to resettle to form cleaned soil and supernatant water, and separating said clean soil from said supernatant water.

4. A method according to claim 3 wherein said particulate coal in said first mixture consists essentially of particles which pass through sieves having opening of 600 microns in size.

5. A method according to claim 1 wherein said feedstock comprises tar wastes, said solid inert inorganic fraction comprises sand and said organic matter comprises tar.

6. A method according to claim 5 wherein in said step (a) said first mixture comprises said tar wastes combined with an aqueous slurry of water and particulate coal which is maintained at a temperature in the range of about 60°-85° at a pH in the range of about 7-9, wherein the ratio of said tar to dry coal and said first mixture is in the range of about 1.0:10 to 4.0:10;

wherein in said step (b) said first mixture is tumbled for about 5-15 minutes, then screened to separate the particles therefrom of average diameter greater than about 3 mm; and further comprising the steps subsequent to step (b) of step (b)(1) agitating said first mixture with high shear force for about 2-5 minutes to form agglomerates; and step (b)(2) adding sufficient water at a pH of 7-7.5 to the agglomerate-containing mixture from step (b)(1) to obtain a concentration of about 5% by weight total solids; then proceeding according to said step (c), wherein said frothing agent is selected from the group consisting of polymeric, cationic and anionic surfactants is added to said resultant mixture in an amount of about 0.01-0.1% by weight based on the total amount present of said coal; and in said step (d) said agitation is accomplished by injecting air to said second mixture with mechanical mixing of said second mixture; and subsequent to said step (e), further comprising the steps of (e)(1) washing said froth over screens with 300-400 micron openings and collecting the resulting cleaned agglomerates; and step (e)(2) collecting the washing from step (e)(1) and combining same with the remaining portion of said second mixture from step (e) to form a third mixture; and step (e)(3) cycloning said third mixture to separate sand contained therein from said third mixture.

7. A method according to claim 6 wherein said particulate coal in said first mixture consists essentially of particles passing through sieves having size openings of 600 microns.

* * * * *

UNITED STATES PATENT AND TRADEMARK OFFICE
CERTIFICATE OF CORRECTION

PATENT NO.  : 5,019,245

DATED       : May 28, 1991

INVENTOR(S): Ignasiak, et al.

It is certified that error appears in the above-indentified patent and that said Letters Patent is hereby corrected as shown below:

ON THE TITLE PAGE:

[73]   Assignee: Electric Power Research Institute, INC., Palo Alto, Calif.

Signed and Sealed this

Twelfth Day of January, 1993

Attest:

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO. : 5,019,245
DATED : May 28, 1991
INVENTOR(S) : Teresa Ignasiak, et. al.

It is certified that error appears in the above-indentified patent and that said Letters Patent is hereby corrected as shown below:

On the Title page, item [76], inventor's names should be listed as following

INVENTOR(S): Teresa Ignasiak, Ali A. Turak, Wanda Pawlak, Boleslaw L. Ignasiak, all of Edmonton, Canada; Carlos R. Guerra of West New York, Melvin L. Zwillenberg of Maplewood, both of New Jersey Column 1, insert before first paragraph --This Invention was made with Government support under Contract No. DE-FG22-87PC79865 awarded by the Department of Energy. The Government has certain rights in this invention.--

Signed and Sealed this

Fifteenth Day of March, 1994

Attest:

BRUCE LEHMAN

Attesting Officer

Commissioner of Patents and Trademarks